United States Patent
Patil et al.

(10) Patent No.: US 10,372,120 B2
(45) Date of Patent: Aug. 6, 2019

(54) MULTI-LAYER ANOMALY DETECTION FRAMEWORK

(71) Applicant: General Electric Company, Schenectady, NY (US)

(72) Inventors: Sundeep R Patil, Garching b. Munich (DE); Ansh Kapil, Bayern (DE); Alexander Sagel, Munich (DE); Lutter Michael, Bayern (DE); Oliver Baptista, Garching (DE); Martin Kleinsteuber, Bayern (DE)

(73) Assignee: General Electric Company, Schenectady, NY (US)

( * ) Notice: Subject to any disclaimer, the term of this patent is extended or adjusted under 35 U.S.C. 154(b) by 84 days.

(21) Appl. No.: 15/287,249

(22) Filed: Oct. 6, 2016

(65) Prior Publication Data

US 2018/0100784 A1 Apr. 12, 2018

(51) Int. Cl.
*G01M 99/00* (2011.01)
*G05B 23/02* (2006.01)

(52) U.S. Cl.
CPC .................. *G05B 23/0243* (2013.01)

(58) Field of Classification Search
USPC .......................................... 701/104; 702/176
See application file for complete search history.

(56) References Cited

U.S. PATENT DOCUMENTS

| 7,136,779 | B2 | 11/2006 | Nitsche et al. |
| 7,203,554 | B2 | 4/2007 | Fuller |
| 7,369,932 | B2 | 5/2008 | Kim et al. |
| 7,421,251 | B2 | 9/2008 | Navratil |
| 8,060,342 | B2 | 11/2011 | Marvasti |
| 8,700,360 | B2 | 4/2014 | Grimella et al. |
| 8,720,258 | B2 | 5/2014 | Meisner et al. |
| 9,245,235 | B2 | 1/2016 | Chen et al. |
| 2007/0028220 | A1* | 2/2007 | Miller ................. G05B 23/0278 717/124 |
| 2015/0276557 | A1* | 10/2015 | Masuda .............. G01M 99/008 702/182 |

OTHER PUBLICATIONS

Russell, Evan L. et al. "Fault Detection in industrial processes using canonical variate analysis and dynamic principal component analysis", Chemometrics and Intelligent Laboratory Systems 51, 2000, (pp. 81-93,13 total pages).

Khatkhate, Amol et al. "Symbolic Time-Series Analysis for Anomaly Detection in Mechanical Systems", IEEE/ASME Transactions on Mechatronics, vol. 11, No. 4, Aug. 2006, DOI: 10.1109/TMECH. 2006.878544, (pp. 439-447, 9 total pages).

(Continued)

*Primary Examiner* — Lam S Nguyen
(74) *Attorney, Agent, or Firm* — Buckley, Maschoff & Talwalker LLC

(57) ABSTRACT

According to some embodiments, a system and method are provided to receive a first plurality of data from a machine associated with a first time period. A normal operation of the machine is automatically determined based on the first plurality of data. A second plurality of data may be received from the machine associated with a second time period. An anomaly in the second plurality of data is determined.

8 Claims, 7 Drawing Sheets

(56) References Cited

OTHER PUBLICATIONS

Chandola, Varun et al. "Anomaly Detection: A Survey", ACM Computing Surveys, vol. 41, No. 3, Article 15, Publication date: Jul. 2009, DOI: 10.1145/1541880.1541882, 58 pp.
Chin, Shin C. et al. "Symbolic time series analysis for anomaly detection: A comparative evaluation", Signal Processing 85 (2005), The Pennsylvania State University, Jun. 24, 2004, DOI: 10.1016/j.sigpro.2005.03.014, (pp. 1859-1868,10 total pages).

* cited by examiner

MULTI-LAYER ANOMALY DETECTION FRAMEWORK

BACKGROUND

Maintenance of various machines such as, but not limited to, engines, turbines, rail vehicles and aircraft, is essential for the longevity of the machines. Early detection and diagnosis of problems, or potential problems, associated with the machines may help avoid loss of use of the machines as well as prevent secondary damage. For example, various components of a machine may breakdown over time and failure to diagnose and repair these breakdowns may lead to loss of use of the machine or, in some cases, the breakdowns may cause damage to other components of the machine thus causing secondary damage. It would therefore be desirable to provide a system to determine problems or potential problems associated with a machine as early as possible to provide time for a repair crew to address the determined or potential problems associated with the machine.

SUMMARY

According to some embodiments, a system and method are provided to receive a first plurality of data from a machine associated with a first time period. A normal operation of the machine may be automatically determined based on the first plurality of data. A second plurality of data may be received from the machine associated with a second time period. An anomaly in the second plurality of data is determined.

Some embodiments described herein relate to a method of creating a framework to automatically detect anomalies. The method may comprise creating a first layer to receive a first plurality of data from a machine associated with a first time period. The first layer may automatically determine a normal operation of the machine based on the first plurality of data. The first layer may receive a second plurality of data from the machine associated with a second time period and determine an anomaly in the second plurality of data. The method may further comprise creating a second layer to receive a plurality of data associated with the anomaly. The second layer may determine if the anomaly is a known anomaly. In a case that the anomaly is a known anomaly, a notification of the known anomaly may be transmitted. Furthermore, in a case that the anomaly is an unknown anomaly, a request for feedback may be transmitted to an end user.

A technical advantage of some embodiments disclosed herein are improved systems and methods for early detection and diagnosis of problems or potential problems associated with machines.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments described herein relate to a framework to detect and label known anomalies/faults associated with time-series data transmitted from a machine (e.g., an engine) such that it may help even non-expert users to interpret the anomaly/fault of the engine. In other words, a non-expert user may be provided with an indication of a fault and an anomaly type such that the non-expert user does not need to manually view specific sensor measurements to identify a root cause of the anomaly.

Secondly the framework described herein may detect anomalies within the time-series data that are unknown and display them to expert users such that the expert users may manually investigate the sensor measurements and provide feedback regarding the anomaly that caused a deviation in sensor measurements. Using this feedback regarding the anomaly, the framework may autonomously learn features and causes associated with the anomaly and store this information as a specific anomaly class. In the future, the framework may label new anomalies using this newly created anomaly class.

Figure 1:
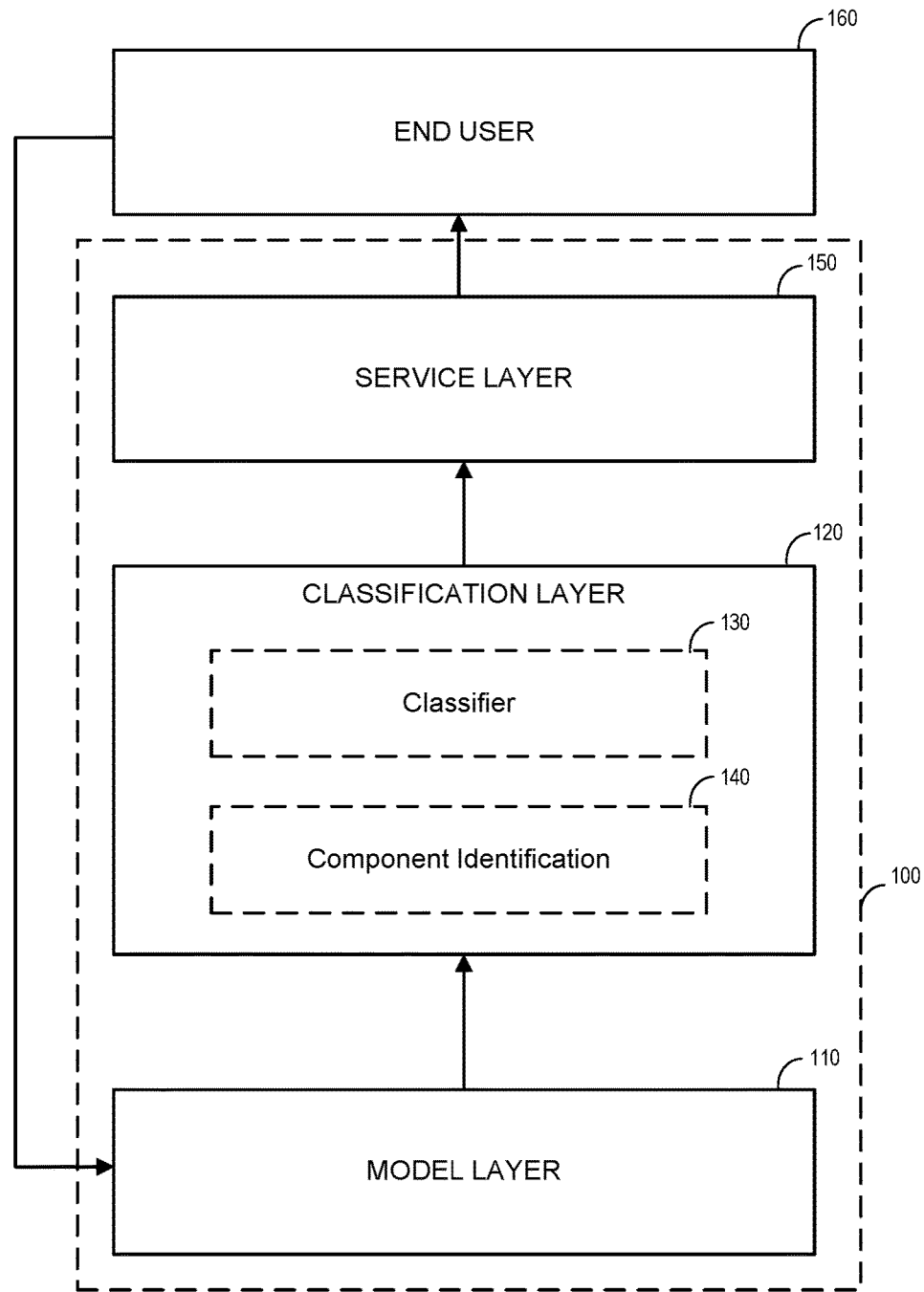
FIG. 1 is a high-level architecture of a framework in accordance with some embodiments.

Now referring to FIG. 1, an embodiment of a framework 100 is illustrated. As illustrated in FIG. 1, the framework comprises a model layer 110, a classification layer 120 and a service layer 150. The model layer 110 may utilize unsupervised learning (e.g., no human supervision/labor required) to learn and model received data associated with a machine to describe a normal operation of the machine. Furthermore, the model layer 110 may be capable of detecting deviations from an existing model to indicate the presence of an anomaly associated with received time-series data. Due to the unsupervised model derivation detection, the embodiments described herein may not require an expert to build an analytical system model and thus models may be created based simply on receiving a plurality of data associated with a machine. The model layer 110 will be described in more detail with respect to FIG. 3.

The classification layer 120 may be divided into a component identification portion 140 and a classifier portion 130. The component identification portion is described in further detail with respect to FIG. 3. Furthermore, the classification layer 120 may be triggered when the model layer 110 detects the existence of an anomaly (e.g., a deviation from the normal behavior of the model) and the classification layer 120 may use a plurality of sensor signals to identify a root cause of an anomaly and assign a label to the anomaly. The label may be assigned using a supervised learning technique that uses previously labeled samples to autonomously learn fault characteristics associated with an anomaly. This approach only requires the labelling by an expert but may not require the labor intensive engineering of an expert to manually design a system to determine the specific anomaly. Therefore, this approach may be scalable to new fault/anomaly types. The model layer 110 will be described in more detail with respect to FIG. 3.

The service layer 150 may comprise a communication mechanism to report anomalies to end users 160 such as expert users and non-expert users. The service layer 150 may provide a first type of indication to non-expert users where the first type of indication clearly states an anomaly type and a component of the machine that caused the anomaly. The service layer 150 may also transmit a second type of indication to expert users where the second type of indication provides results to expert users such that the expert users may manually investigate sensor measurements to provide feedback regarding the anomaly to the model layer 110. The service layer 150 may send indications via email, text message, or may provide alerts on a system screen or via an audible alarm.

Figure 2:
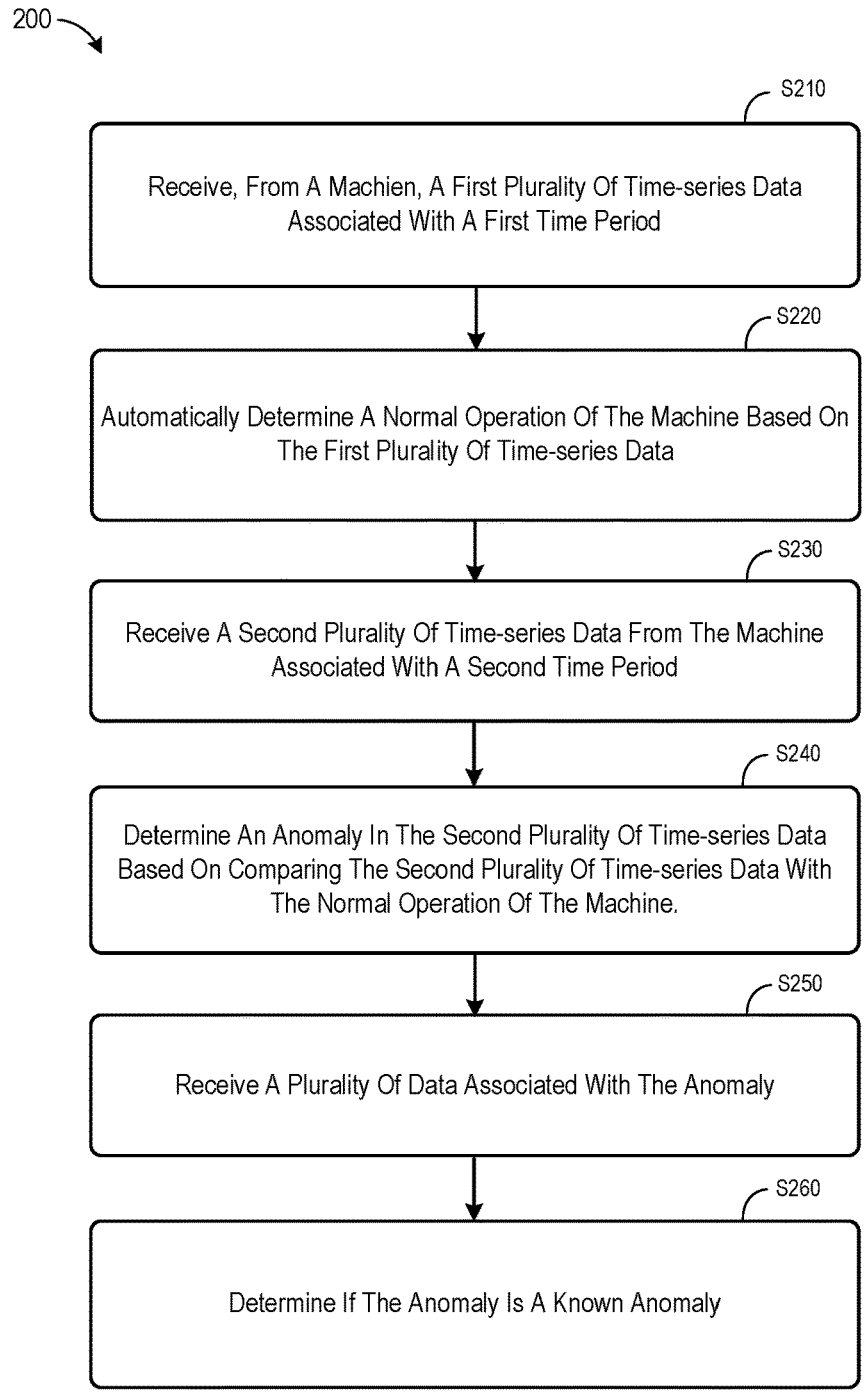
FIG. 2 illustrates a process according to some embodiments.

FIG. 2 illustrates a method 200 that might be performed by some or all of the elements of the framework 100 described with respect to FIG. 1. The flow chart described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Figure 3:
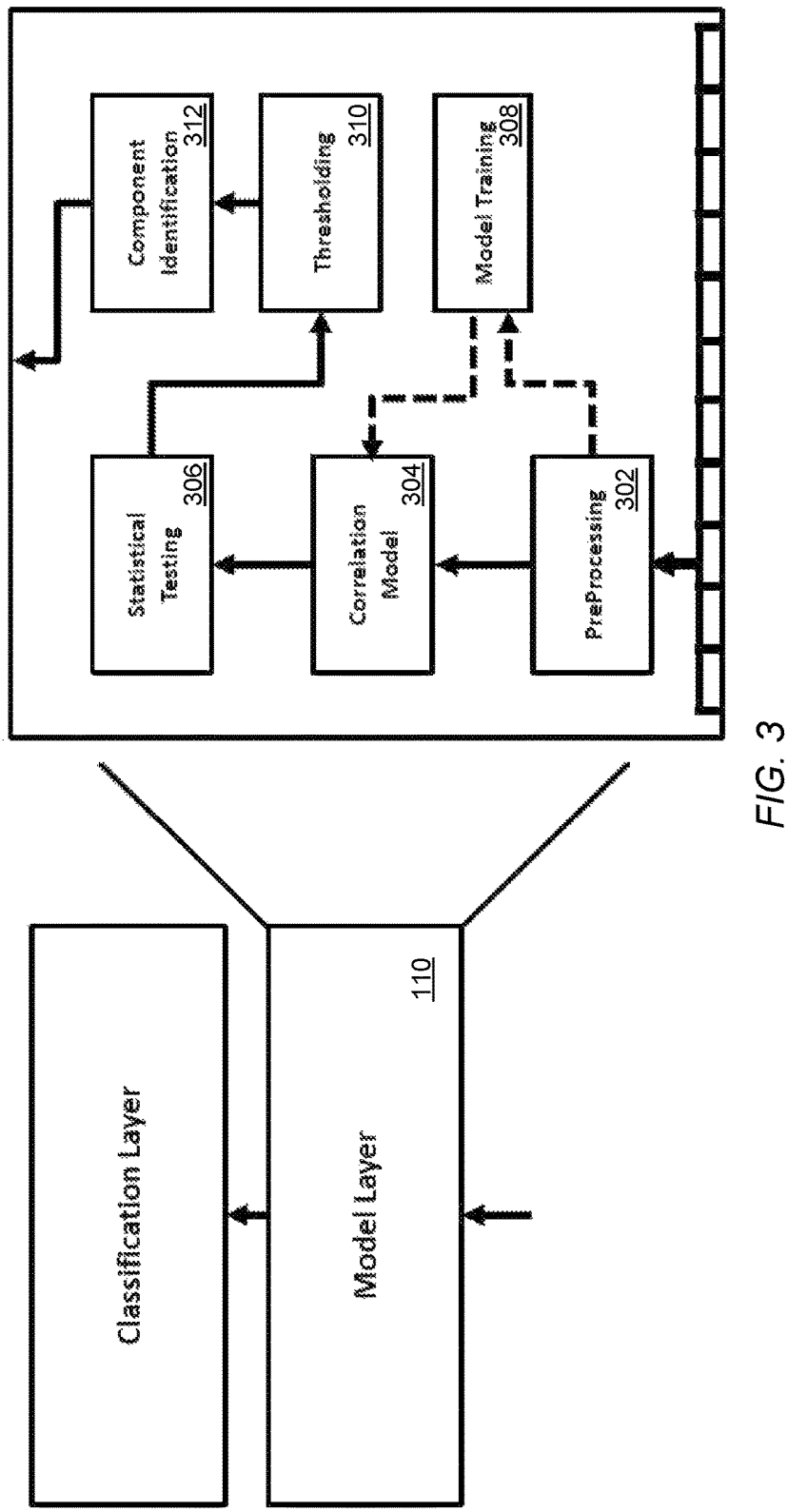
FIG. 3 illustrates a model layer of a framework in accordance with some embodiments.

At S210, a first plurality of data associated with a first time period is received from a machine. The first plurality of data may comprise time-series data. In some embodiments, the first time period may comprise one or more hours of operation of the machine. For example, after a machine has been serviced and is in good working order, the machine may be operated for one or more hours to develop a model that takes into account time, internal temperatures, an external temperature, voltages, resistances, capacitances, etc. Thus, in some embodiments, the model may be able to illustrate normal operation of temperatures, voltages, resistances and capacitances during typical operation of the machine. In some embodiments, the data may comprise a stacked data vector. For example, and now referring to FIG. 3, an embodiment of a model layer is illustrated. As illustrated in FIG. 3, the model layer consists of multiple sub-units that may be used for the unsupervised creation of one or more models as well as the unsupervised detection of anomalies. First, the model layer may aggregate a plurality of raw sensor data received from one or more sensors associated a machine (e.g., an engine, an airplane, a rail vehicle, etc.) at a preprocessing unit 302.

The plurality of raw sensor data may comprise measurements from multiple input streams and the aggregated stream may be preprocessed at the processing unit 302 by removing any non-operating situations (such as, but not limited to, maintenance, shut-downs etc.) that are indicated by the data (e.g., data that indicates that the machine was turned off). Furthermore, the preprocessing unit 302 may also stack the data to combine the data based on a time of occurrence. In this manner, the model layer may be able to examine the operation of the machine based on a wide view of how the machine is operating by looking at all sensor data over a particular time period instead of looking at data associated with a single sensor.

At S220, a normal operation of the machine is automatically determined based on the first plurality of data. In other words, a model may be automatically created for the machine where the model represents the normal operation of the machine as indicated during the first time period. Referring back to FIG. 3, a correlation model unit 304 of the model layer 110 may determine if a model for the machine has already been learned. In a case that no model exists, the received data may be routed to a model training unit 308 to automatically learn the normal operation of the machine and create a model associated with the received data. However, if a model already exists for the received data, a model stored in the correlation model unit 304 may be used to compare newly received data. In some embodiments, the models stored in the correlation model unit 304 may comprise Dynamic Principal Component Analysis ("Dynamic PCA") models. A Dynamic PCA model may learn temporal and spatial correlations between sensors and the normal operating range. Unlike conventional models, a Dynamic PCA model significantly extends previous approaches, which model different sensor signals independently. Thus, a technical effect of using a Dynamic PCA model is that modeling based on the combination of sensors may be capable of detecting deviations on a global level. For example, the conventional models cannot detect deviations where the local sensor behavior is normal under a local model while a global correlation between neighboring sensors deviates. In particular, for embodiments related to gasoline powered engines, determining faults within the individual cylinders may require a global view of the gasoline engine instead of modeling each individual cylinder or each individual valve. For example, it is well known that at different operating conditions (load changes, speed requirements, mixer gas concentrations etc.), the temperature of a cylinder may change. While an increase in temperature for one cylinder might seem normal with different operating conditions, if other cylinders are not indicating a temperature increase or a temperature increase of a same magnitude, then the first cylinder may be indicating a failure or potential failure.

At S230, a second plurality of data associated with a second time period is received from the machine. The second time period may occur after the first time period. The second plurality of data may comprise time-series data from the machine in operation. In some embodiments, the data may comprise a stacked data vector. For example, and again referring to FIG. 3, once newly sensed data from the machine is received, the newly sensed data may be compared to a model stored in the correlation model unit 304. For example, instead of examining a single element, the present embodiments may compare temperatures, voltages, resistances and capacitances during a current operation of the machine and compare these factors with the temperatures, voltages, resistances and capacitances that should occur during typical operation of the machine.

At 240, an anomaly in the second plurality of data may be determined. Again referring to FIG. 3, and based on the comparison between the currently received data and the model for the machine, statistics associated with the comparison may be computed at a statistical testing unit 306 to determine a deviation of the currently received data from the normal behavior as indicated by the model stored in the correlation model unit 304. The results of the statistical testing unit 306 may be fed to a thresholding unit 310 to determine a significance of the deviation. For example, if a predefined threshold that indicates a significant deviation of the normal operation from the model is crossed, the sensors that provided the data associated with deviation or majorly contributed to the deviation are identified and an alarm for the sensor signal may be triggered. From the thresholding unit 310, the currently received data may be received at a component identification unit 312 to identify a specific component associated with the anomaly. The component identification unit 312 may determine a specific component associated with the anomaly based on identifying a sensor or sensors that provided the data associated with deviation or majorly contributed to the deviation. Since the model layer 110 may use Dynamic PCA to construct the normal operation model, the model layer 110 may not require experts to manually design a system model. The model layer 110 may only require expert knowledge to adapt the preprocessing for the given system but not for any specific fault or anomaly.

Figure 4:
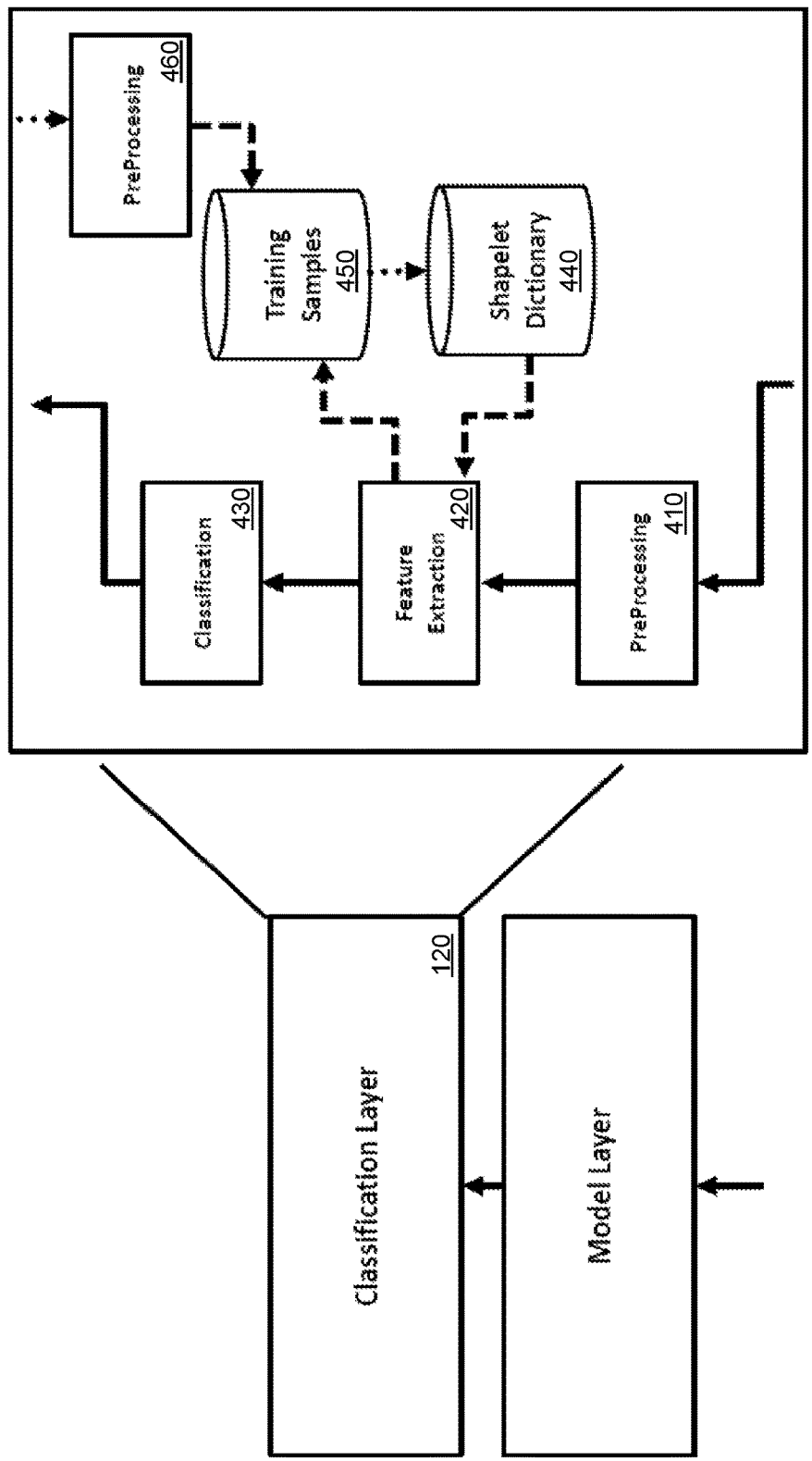
FIG. 4 illustrates a classification layer of a framework in accordance with some embodiments.

At 250, a plurality of data associated with the anomaly may be received. The plurality of data associated with the anomaly may be received at the classification layer 120. Now referring to FIG. 4, an embodiment of a classification layer 120 is illustrated. Once the model layer 110 detects a significant deviation from normal operation, as described above, the classification layer 120 may be triggered to assign a predefined anomaly type to the deviation based on the data received from the model layer regarding the anomaly.

At 260, a determination if the anomaly is a known anomaly is made. In some embodiments, the data received from the model layer 110 may be subjected to a preprocessing step involving a high-pass filter in order to remove possible temperature bias from the signal. The preprocessing may be performed at a preprocessing unit 410. The data received from the model layer 100 may comprise data from the one or more sensors as well as additional context information associated with each sensor. For example, in the case of a cylinder from an engine, the classification layer may expect to receive a single cylinder signal as its input with some additional context information such as location of the sensor, type of sensor, etc.

To determine a cause of the anomaly, a feature extraction unit 420 may apply a transform to the preprocessed signal which may provide feature vectors. For example, the feature extraction unit 420 may utilize a transform, such as, but not limited to, a shapelet transform to extract local features from the received signal. Feature vectors may be extracted based on training data from a dictionary. In some embodiments, a shapelet transform may require the use of a training shapelet dictionary 440 with respect to which the transform is computed. A feature vector may comprise similarity indicators between the provided signal and each shapelet in the dictionary. For example, the shapelet dictionary 440 may store distinctive features of a signal.

A shapelet may be considered a time series data mining primitive that can be used to determine similarity based on small common shapes occurring at any point in a series. The determination of a shapelet requires generating a set of candidates, defining a distance measure between a shapelet and each time series, and defining a measure of the discriminatory power of a shapelet. In some embodiments, a shapelet transformation may perform a single scan of the data to extract a best M shapelets. In some embodiments, M may comprise a cut-off value for the maximum number of shapelets to store. Next, an appropriate value for the number of shapelets to use in the final transformed data set is estimated using a cross-validation approach. Thirdly, a new transformed data set maybe created where each attribute represents a shapelet, and the value of each attribute is a distance from the shapelet to the original series. The transformed data set may be provided as feature vectors. In this way, the shapelet transform may allow a transformed data set to be used in conjunction with any classifier.

The resulting feature vectors from the nonlinear shapelet transform may be fed into a classification unit 430 (e.g., a classifier), such as, but not limited to, a k-Nearest Neighbors Classifier. The classifier may return a known anomaly class if a proportion of the respective class within the nearest neighbors is considered significant. For example, the classifier may classify an unknown anomaly based on how far away it is, proportionally, from a first known anomaly or a second known anomaly.

In a case that the anomaly is a known anomaly, a notification of the known anomaly may be transmitted to a non-expert user. In a case that the anomaly is an unknown anomaly, a request for feedback may transmitted to an expert user. For example, if the comparison of feature vectors does not yield a result that meets a threshold of closeness, a request may be sent to an expert user for feedback regarding the error. The request may comprise sensor information/location and request the expert user provide a description of a cause of the anomaly. Such a description may be first be sent to a preprocessing unit 460 and then saved as a training sample in a training sample unit 450. Once the classification unit 430 determines a root cause of the anomaly, information indicating the root cause of the anomaly may be sent to a service layer, such as service layer 150, to notify a user.

Figure 5:
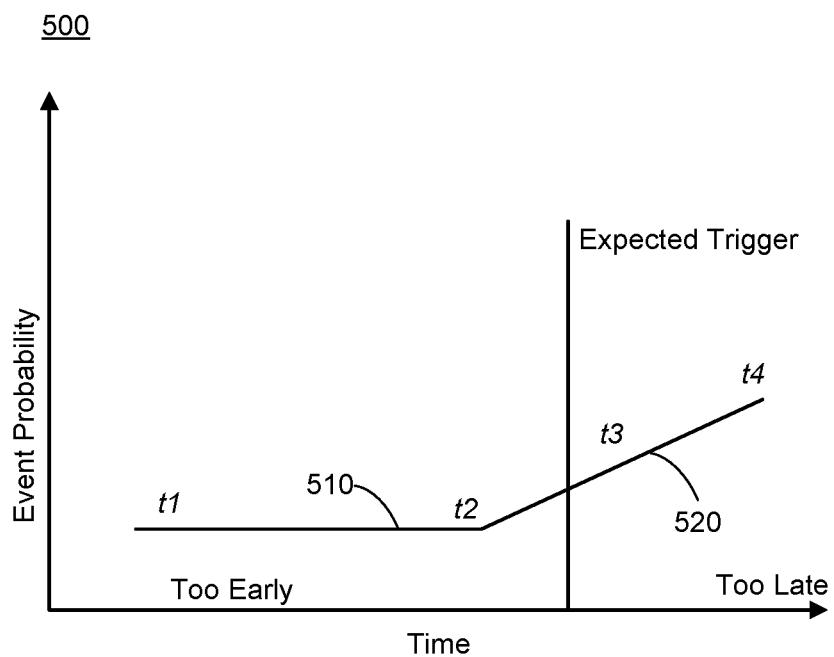
FIG. 5 illustrates a notification timing diagram according to some embodiments.

Now referring to FIG. 5, a notification timing diagram 500 is illustrated according to some embodiments. The timing diagram 500 may illustrate a first time period 510 when notifications to users are too early and a second time period 520 when notifications to users are too late. As illustrated in FIG. 5, an anomaly may first be detectable at a time $t_1$. However, at $t_1$ only minimal information may be known about the anomaly and thus it may be too early to notify a user. On the other end of the spectrum, at time $t_4$ it may be too late to notify a user of the anomaly because secondary damage related to the machine may already have occurred. Therefore, a desirable time to notify the user is between $t_2$ and $t_3$. However, $t_2$ and $t_3$ may be different for each type of machine and may be different for each user based on a user's response times. Therefore, the framework may allow for users to adjust parameters in order to alter times $t_2$ and $t_3$ so that the framework provides notification at a most desirable time for an end user. (e.g., depending on a time it takes to order parts, to plan for onsite inspection etc.)

Figure 6:
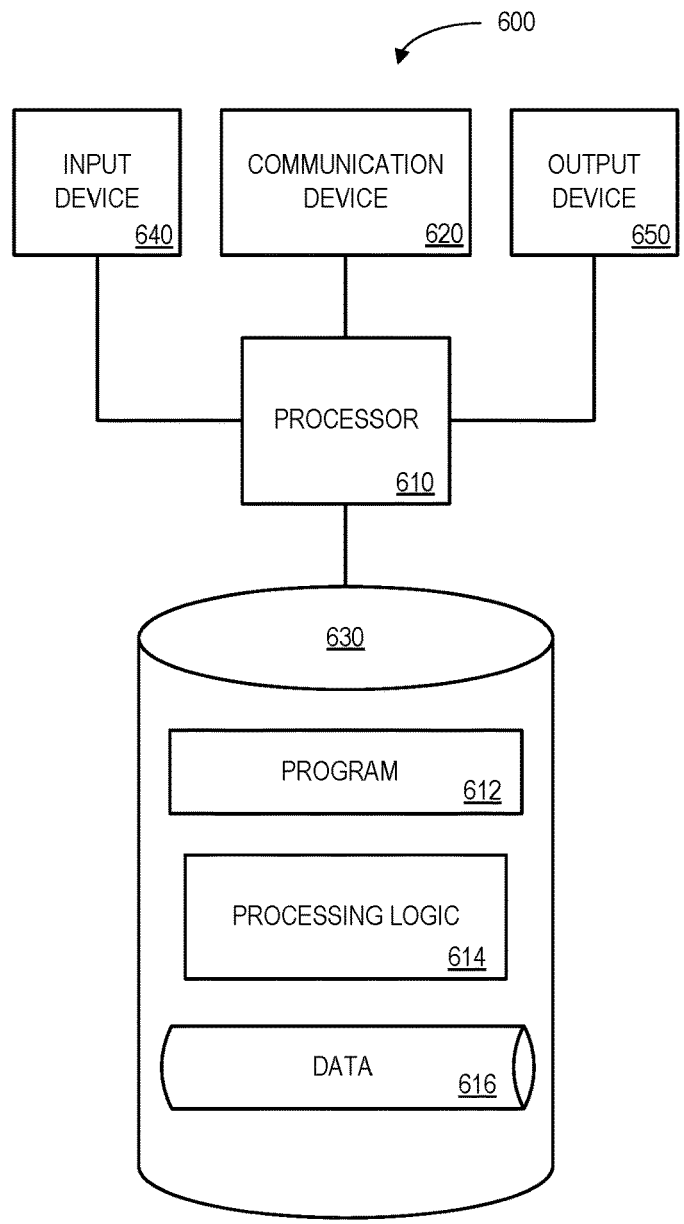
FIG. 6 illustrates a system in accordance with some embodiments.

Note the embodiments described herein may be implemented using any number of different hardware configurations. For example, FIG. 6 illustrates a framework processing platform 600 that may be, for example, associated with the framework 100 of FIG. 1. The framework processing platform 600 may comprise a processor 610 ("processor"), such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more users such as expert users and non-expert users. The geometrical compensation processing platform 600 further includes an input device 640 (e.g., a mouse and/or keyboard to enter information about the measurements and/or assets) and an output device 650 (e.g., to output and display the data and/or recommendations).

The processor 610 also communicates with a memory/storage device 630 that stores data 616. The storage device 630 may comprise any appropriate information storage device, including combinations of magnetic storage devices (e.g., a hard disk drive), optical storage devices, mobile telephones, and/or semiconductor memory devices. The storage device 630 may store a program 612 and/or processing logic 614 for controlling the processor 610. The processor 610 performs instructions of the programs 612, 614, and thereby operates in accordance with any of the embodiments described herein. For example, the processor 610 may receive data from a machine and may create a model based on the data and/or may also detect anomalies via the instructions of the programs 612 and processing logic 614.

The programs 612, 614 may be stored in a compiled, compressed, uncompiled and/or encrypted format or a combination. The programs 612, 614 may furthermore include other program elements, such as an operating system, a database management system, and/or device drivers used by the processor 610 to interface with peripheral devices.

As used herein, information may be "received" by or "transmitted" to, for example: (i) the platform 600 from another device; or (ii) a software application or module within the platform 600 from another software application, module, or any other source.

Figure 7:
FIG. 7 illustrates a portion of a database table according to some embodiments.

FIG. 7 is a tabular view of a portion of a database 700 in accordance with some embodiments of the present invention. The table includes entries associated with anomaly data. The table also defines fields 702, 704, 706, 708, 710, and 712 for each of the entries. The fields specify: an anomaly ID 702, a first anomaly feature 704, a second anomaly feature 706, a third anomaly feature 708, a Nth anomaly feature 710 and a machine ID 712. The information in the database 700 may be periodically created and updated based on information collection during operation of machines as they are received from one or more sensors.

The anomaly ID 702 might be a unique alphanumeric code identifying a specific type of anomaly and the anomaly features 704/706/708/710 might provide information related to specific features associated with an anomaly such as frequencies, patterns of a signal, etc. but embodiments may be associated with any related anomaly feature data. The machine ID 712 might be a unique alphanumeric code identifying a specific type of machine such as a specific engine type or a specific engine based on a serial number of the engine.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a geometrical compensation module. The method steps can then be carried out using the distinct software modules and/or sub-modules of the system, as described above, executing on one or more hardware processors 610 (FIG. 6). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method of determining an anomaly associated with an engine, the method comprising:
   receiving, from the engine, a first plurality of time-series data associated with a first time period, wherein at least a portion of the first plurality of time-series data comprises first sensor measurements from a plurality of sensors for a plurality of cylinders of the engine, each of the plurality of sensors corresponding to a respective cylinder of the plurality of cylinders;

automatically determining, via a processor, a normal operation of the engine based on the first plurality of time-series data, wherein the automatically determining of the normal operation comprises an unsupervised creation of one or more models based on the first plurality of time-series data and an aggregation of the first sensor measurements;

receiving a second plurality of time-series data from the engine associated with a second time period, wherein at least a portion of the second plurality of time-series data comprises second sensor measurements from the plurality of sensors;

automatically determining an anomaly in the second plurality of time-series data based on comparing the second plurality of time-series data with the normal operation of the engine to at least detect one or more deviations in the sensor measurements for individual sensors of the plurality of sensors.

2. The method of claim 1, further comprising:
receiving a plurality of data associated with the anomaly;
determining if the anomaly is a known anomaly;
in a case that the anomaly is a known anomaly, transmitting a notification of the known anomaly; and
in a case that the anomaly is an unknown anomaly, transmitting a request for feedback to an end user.

3. The method of claim 2, further comprising:
determining a cause of the anomaly by applying a nonlinear shapelet transform to the plurality of data associated with the anomaly;
receiving feature vectors based on an output of the shapelet transform; and
feeding the feature vectors into a classifier where the classifier returns an anomaly class.

4. A non-transitory computer-readable medium comprising instructions that are executable by a processor to perform a method of creating a framework to automatically detect anomalies, the method comprising:
creating, via a processor, a first layer to
receive, from an engine, a first plurality of time-series data associated with a first time period, wherein at least a portion of the first plurality of time-series data comprises first sensor measurements from a plurality of sensors for a plurality of cylinders of the engine, each of the plurality of sensors corresponding to a respective cylinder of the plurality of cylinders,
automatically determine a normal operation of the engine based on the first plurality of time-series data, wherein the automatic determination of the normal operation comprises an unsupervised creation of one or more models based on the first plurality of time-series data and an aggregation of the first sensor measurements,
receive a second plurality of time-series data from the machine associated with a second time period, wherein at least a portion of the second plurality of time-series data comprises second sensor measurements from the plurality of sensors, and
determine an anomaly in the second plurality of time-series data based on comparing the second plurality of time-series data with the normal operation of the engine to at least detect one or more deviations in the sensor measurements for individual sensors of the plurality of sensors;

creating, via the processor, a second layer to receive a plurality of data associated with the anomaly, determine if the anomaly is a known anomaly where in a case that the anomaly is a known anomaly, transmit a notification of the known anomaly and, in a case that the anomaly is an unknown anomaly, transmit a request for feedback to an end user.

5. The medium of claim 4, wherein the second layer determines a cause of the anomaly by applying a nonlinear shapelet transform to the plurality of data associated with the anomaly, receiving feature vectors based on an output of the shapelet transform and inputting the feature vectors into a classifier where the classifier returns an anomaly class.

6. A system for early detection of problems associated with a machine, the system comprising:
a processor;
a non-transitory computer-readable medium comprising instructions executable by the processor to perform a method to automatically detect anomalies, the method comprising:
receiving, from an engine, a first plurality of time-series data associated with a first time period, wherein at least a portion of the first plurality of time-series data comprises first sensor measurements from a plurality of sensors for a plurality of cylinders of the engine, each of the plurality of sensors corresponding to a respective cylinder of the plurality of cylinders;
automatically determining, via the processor, a normal operation of the engine based on the first plurality of data, wherein the automatic determination of the normal operation comprises an unsupervised creation of one or more models based on the first plurality of time-series data and an aggregation of the first sensor measurements;
receiving a second plurality of time-series data from the engine associated with a second time period, wherein at least a portion of the second plurality of time-series data comprises second sensor measurements from the plurality of sensors; and
determining an anomaly in the second plurality of time-series data based on comparing the second plurality of time-series data with the normal operation of the engine to at least detect one or more deviations in the sensor measurements for individual sensors of the plurality of sensors.

7. The system of claim 6, further comprising instructions for:
receiving a plurality of data associated with the anomaly;
determining if the anomaly is a known anomaly;
in a case that the anomaly is a known anomaly, transmitting a notification of the known anomaly; and
in a case that the anomaly is an unknown anomaly, transmitting a request for feedback to an end user.

8. The system of claim 7, further comprising instructions for:
determining a cause of the anomaly by applying a nonlinear shapelet transform to the plurality of data associated with the anomaly;
receiving feature vectors based on an output of the shapelet transform; and
feeding the feature vectors into a classifier where the classifier returns an anomaly class.

* * * * *